Patented Feb. 28, 1928.

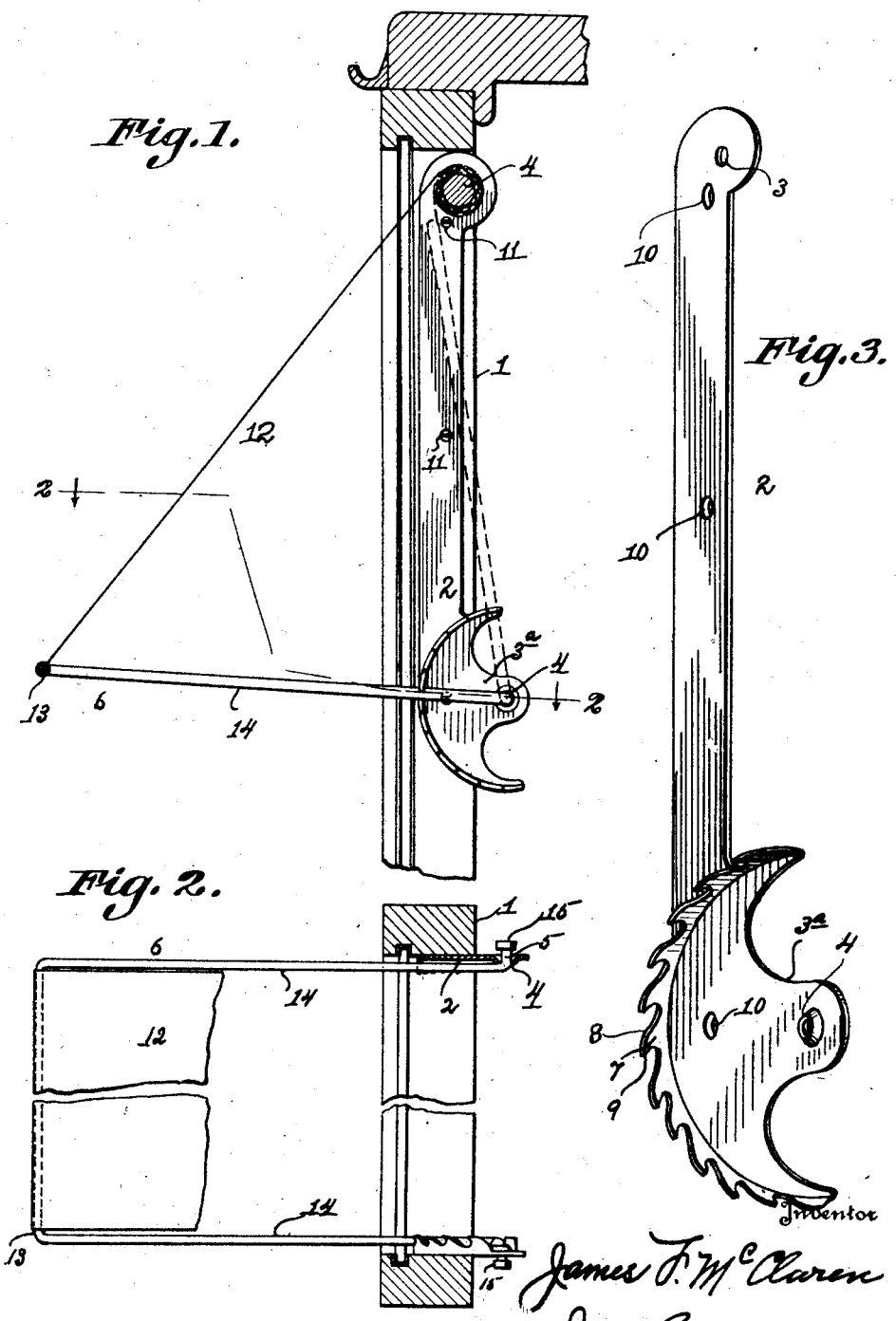

1,660,878

UNITED STATES PATENT OFFICE.

JAMES F. McCLAREN, OF WASHINGTON, DISTRICT OF COLUMBIA.

AWNING FOR VEHICLES.

Application filed April 4, 1927. Serial No. 180,856.

This invention relates to improvements in awnings especially adapted for use for the glazed portions of the doors of closed motor cars and also adapted for use over the windows of buildings and for other similar uses.

One object of the invention is to provide improved brackets which may be readily attached to a door or window frame and each of which is provided with a bearing for the awning roller, a bearing also for the bow or frame and is also provided with a ratchet segment for use in connection with the bow to hold the latter in any desired adjusted position.

Another object is to provide an improved bow or frame which is made of spring metal and which operates automatically in connection with the ratchet segment of the bracket to secure the bow and hence also the awning in desired adjusted position.

With the above and other objects in view, the invention consists in the construction, combination and arrangement of devices hereinafter described and claimed.

In the accompanying drawings

Figure 1 is a vertical section of a portion of an automobile door provided with an awning constructed in accordance with my invention and showing the awning in position for use in full lines and in withdrawn position in dotted lines.

Figure 2 is a horizontal sectional view of the same on the planes indicated by the line 2—2 of Figure 1.

Figure 3 is a detail perspective view of one of the brackets.

A door of an automobile is indicated at 1. In accordance with my invention I provide a pair of brackets 2 which are made preferably of sheet metal of suitable gage and each of which is provided near the upper end with a bearing opening 3 for the reception of one of the journals of a spring roller 4 and also, near the lower end, with an inwardly extending arm 3ª which has a bearing opening 4 for the reception of one of the outstanding pivots or wrists 5 of a U-shaped bow or frame 6. Each bracket is also provided with a ratchet segment 7 concentric with the bearing opening 4 and which segment projects from the inner side of the bracket and each tooth of which extends downwardly and presents a compound curved outer edge 8 and forms a hook shaped point 9 which partially overlaps the next adjacent tooth. The carrier members are also provided at suitable points with openings 10 for the reception of screws 11 wherewith to secure the carrier members to the opposing sides of the door frame as shown.

The awning 12 which may be made of any suitable fabric or other material, is attached at one end to the spring roller 4 and is arranged to be wound thereon by the action of the spring roller and to be unwound therefrom and arranged in stretched condition between the spring roller and the intermediate portion 13 of the bow, to which intermediate portion the outer end of the awning is also attached as shown. The bow 6 is made of spring metal of suitable gage and its arms 14 spring outwardly or away from each other so that the bow automatically, by its own elasticity, engages its arms with the teeth of the ratchet segment, as will be understood.

By moving the arms 14 slightly toward each other, they may be disengaged from the ratchet segment teeth to enable the bow to be turned to any desired position to appropriately adjust the awning as may be desired. To prevent casual disengagement of the pivot portion 5 of the bow from the bearing openings 4 of the carrier members, I provide said portions 5 with suitable heads 15 at their outer ends.

It is thought the operation of the invention will be fully understood from the foregoing description. Owing to the provision of the brackets each of which is provided with bearings for the spring roller and the bow and also with a ratchet segment for engagement with one arm of the bow, it is only necessary, in attaching an awning, to a car door, to secure the brackets in the opposing sides of the door by the screws 11, which may be readily done in a very few minutes and with the employment of only a screw driver. The brackets may be readily manufactured at small cost. When the awning is detached all of its parts may be readily arranged compactly for storage or transportation.

Having thus described my invention, what I claim is:

1. In a roller awning construction provided with a swinging resilient bow and a spring roller, a bracket having means whereby said bracket may be mounted on a jamb of a window frame, the upper end of said bracket being adapted to receive an end pintle of the awning roller, and the lower end of said bracket being provided with means for pivotally and adjustably mounting the bow and also with a semi-arc provided circumferentially with downwardly extending ratchet teeth, each of which partially overlaps the next lower tooth, and adapted to selectively hold said bow in lowered position.

2. A roller awning construction as claimed in claim 4, in which the bow is provided with oppositely extending pivoting end portions one provided at the outer end with a head, and the bracket has a bearing opening in the semi-arc through which said headed end portion extends and is longitudinally movable to engage and disengage the bow from the ratchet teeth. and said head by engagement with said semi-arc limits the extent of the inward movement of said headed end portion.

In witness whereof I affix my signature.

JAMES F. McCLAREN.